United States Patent
Katsumura et al.

(10) Patent No.: US 6,307,826 B1
(45) Date of Patent: Oct. 23, 2001

(54) INFORMATION RECORDING MEDIUM AND METHOD FOR RECORDING INFORMATION THEREON

(75) Inventors: Masahiro Katsumura; Tetsuya Iida, both of Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/583,922

(22) Filed: May 31, 2000

(30) Foreign Application Priority Data

May 31, 1999 (JP) .................................................. 11-152020

(51) Int. Cl.[7] ...................................................... G11B 7/00
(52) U.S. Cl. ............................................ 369/101; 369/126
(58) Field of Search .................................. 369/101, 100, 369/126, 272; 250/305, 306

(56) References Cited

U.S. PATENT DOCUMENTS 5,270,990 * 12/1993 Mizasawa et al. ............... 369/101 X
6,157,610 * 12/2000 Hagiwara .......................... 369/126 X

* cited by examiner

Primary Examiner—Muhammad Edun
(74) Attorney, Agent, or Firm—Arent Fox Kintner Plotkin & Kahn, PLLC

(57) ABSTRACT

An information recording medium using a substrate having light transmittancy permitting high density recording to be achieved and a recording method permitting such an information recording medium using a substrate having light transmittancy to be recorded in a high density are provided. The information recording medium is formed by layering an ITO film and EB resist on a transparent insulating substrate formed of a glass material having light transmittancy. At the time of recording information, as the ITO film is set at a ground potential, an electron beam having recording information is irradiated upon a surface of the EB resist for a prescribed scanning to perform electron beam exposure, and pits corresponding to the information to be recorded are formed at the exposed positions.

6 Claims, 7 Drawing Sheets (EXPOSURE)

- 4f — ANTISTATIC FILM
- 4c — EB RESIST
- 4b — ITO FILM
- 4a — GLASS SUBSTRATE (TRANSPARENT INSULATING SUBSTRATE)

(EXPOSURE)

FIG.5
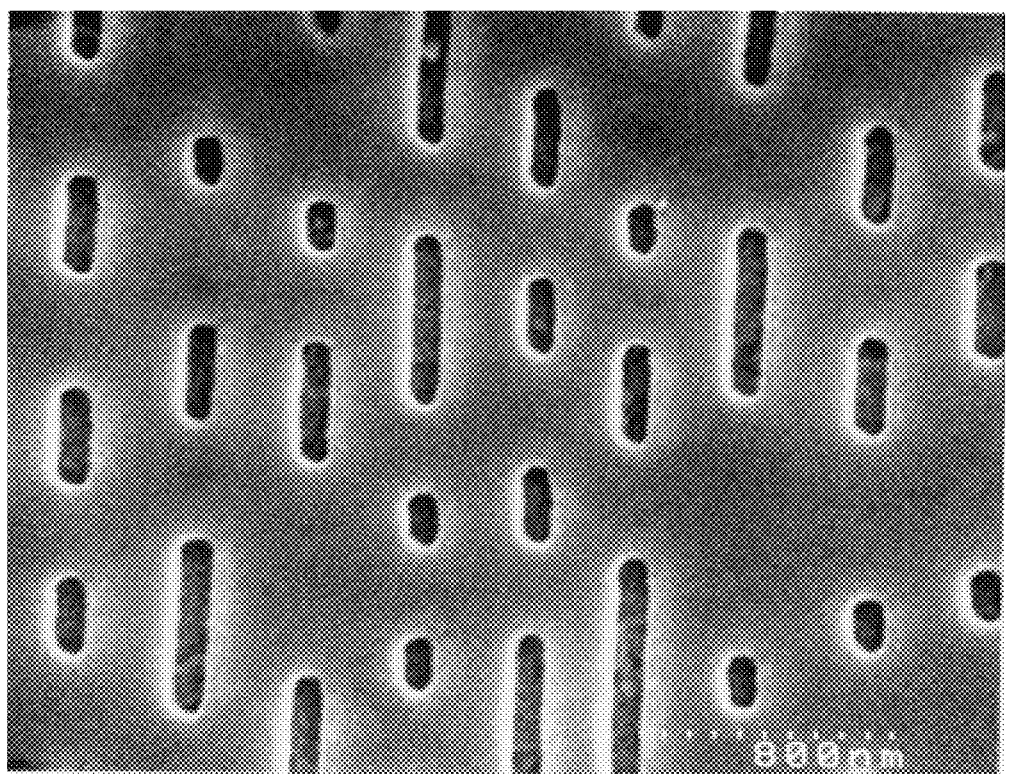
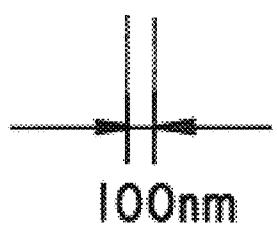
100nm

|—+|—
130nm

|—+|—
100nm

INFORMATION RECORDING MEDIUM AND METHOD FOR RECORDING INFORMATION THEREON

BACKGROUND OF THE INVENTION

The present invention relates to a structure of an information recording medium permitting high density recording and a method for recording information thereon.

In recent years, there have been proposed information recording media such as DVD (Digital Video Disc or Digital Versatile Disc) which permit a large capacity of information exceeding ten and several gigabytes to be recorded in a high density. In order to manufacture a master disc (information recording medium used as a master copy) to fabricate such a high density information recording medium, a master disc recording method using an electron beam has been proposed in place of a mastering technique using a laser beam.

According to the mastering technique for master disc recording using an electron beam, electron beam resist (hereinafter referred to as "EB resist") is applied on an insulating substrate formed of a glass material having light transmittancy, an electron beam having its spot size reduced is directly irradiated upon the EB resist to perform exposure (electron beam exposure), and the exposed part of the EB resist is removed away by development processing to form pits representing information to be recorded.

Then, in order to evaluate the manufactured master disc, a laser beam having a prescribed wavelength and a reduced spot size is allowed to come in from the side of the insulating substrate, light returned from a recording surface is optically detected and an evaluation for example as to whether the pits or the like are appropriately formed on the recording surface is performed.

As described above, in the mastering technique to which the electron beam exposure is applied, the manufactured master disc must be optically evaluated, and therefore an insulating substrate made of a glass material which is transparent to light, in other words, a material which passes light therethrough is used.

When a master disc having such an insulating substrate is recorded using an electron beam, however, charged electrons accumulate in the insulating substrate by the irradiation of the electron beam. Therefore, the electron beam incident to the EB resist is deflected by the charged electrons and the master disc cannot be recorded in a high density.

FIG. 6A through FIG. 6C are diagrams for use in illustration of a mechanism of how the electron beam is deflected in comparison with a semiconductor manufacturing process.

Referring to FIG. 6A, when electron beam exposure is performed in a semiconductor manufacturing process, EB resist is applied on a silicon semiconductor substrate having a semi-insulating characteristic, and the EB resist is directly irradiated with an electron beam for exposure while the silicon semiconductor substrate is set at a ground potential.

If the silicon semiconductor substrate is thus set at the ground potential, charged electrons e$^-$ generated at the time of the incidence of the electron beam to the silicon semiconductor substrate are passed through the silicon semiconductor substrate having the semi-insulating characteristic and removed onto the side of the ground terminal, so that the electron beam comes into the EB resist straightforward without the influence of the charged electrons e$^-$, and high resolution electron beam exposure is enabled.

In contrast, the mastering technique for recording a master disc using an electron beam, as shown in FIG. 6B, the EB resist is applied on the above described insulating substrate which is transparent to light, and the EB resist is directly irradiated with the electron beam for exposure. In this case, charged electrons e$^-$ generated at the time of incidence of the electron beam to the insulating substrate accumulate in the insulating substrate. Therefore, the electron beam is deflected by the influence of the charged electrons e$^-$.

Furthermore, if the electron beam exposure is performed as the insulating substrate is set at the ground potential similarly to the semiconductor manufacturing process, charged electrons e$^-$ accumulate in the insulating substrate rather than being removed to the ground terminal side, because the insulating substrate is not conductive, which will deflect the electron beam.

Thus, in the master disc recording to manufacture an optical recording medium, the electron beam is kept from advancing straightforward, and as a result, it is sometimes difficult to achieve desired high density recording.

In order to reduce the accumulation of charged electrons e$^-$ shown in FIG. 6B, an antistatic film is layered on the EB resist as shown in FIG. 6C, and electron beam exposure is attempted in such a state that the antistatic film is set at the ground potential. Also in this case, however, charged electrons e$^-$ accumulate in the insulating substrate, and therefore the electron beam is deflected in the EB resist by the influence of the charged electrons e$^-$, which impairs high density master disc recording.

Meanwhile, FIG. 7A is a micrograph showing the shape of pits formed when layering EB resist and an antistatic film on the insulating substrate made of a glass material shown in FIG. 6C and then being followed by electron beam exposure, while FIG. 7B is a micrograph showing the shape of pits formed by electron beam exposure using a silicon semiconductor substrate similarly to the semiconductor manufacturing process shown in FIG. 6A. As can be clearly seen from these micrographs, difficulty in performing high density master disc recording using the insulating substrate was confirmed.

SUMMARY OF THE INVENTION

The present invention is directed to a solution to the problems associated with the conventional technique described above, and it is an object of the present invention to provide an information recording medium using an insulating substrate having light transmittancy and allowing high density recording, and a recording method allowing high density recording to an information recording medium using an insulating substrate having light transmittancy.

In order to achieve the above described object, an information recording medium according to the present invention is recorded with information using an electron beam and comprises an insulating substrate formed of a glass material or the like being transparent to light and having light transmittancy, a conductive film layered on the above insulating substrate and having light transmittancy, and an electron sensitive layer layered on the above conductive film. When information is recorded using an electron beam, the electron beam is irradiated on the electron sensitive layer in such a state that the above conductive film is set at a potential to absorb electrons generated by the irradiation of the electron beam.

There is also provided a method for recording an information on such a recording medium in which an electron sensitive layer is provided on an insulating substrate formed of a glass material or the like being transparent to light and having light transmittancy for recording information to the electron sensitive layer by irradiating an electron beam to the information recording medium. According to the method, a conductive film having light transmittancy and the electron sensitive layer described above are layered on the insulating substrate described above, and in such a state that the conductive film is set at a potential to absorb electrons generated by the irradiation of the electron beam, the electron sensitive layer is irradiated with the electron beam described above.

According to the information recording medium and the recording method of the information recording medium, when charged electrons are generated in the insulating substrate by irradiating an electron beam, the charged electrons are removed through the conductive film set at the above described potential. Therefore, unlike the conventional technique, such charged electrons will not accumulate in the insulating substrate, so that the electron beam can come straightforward into the electron sensitive layer and high density recording is achieved. In addition, since an insulating substrate being transparent to light is used, a laser beam or the like may be allowed to come into from the insulating substrate side to optically read information recorded in the electron sensitive layer.

There is also provided an information recording medium on which information is recorded using an electron beam comprising an insulating substrate formed of a glass material or the like being transparent to light and having light transmittancy, a conductive film layered on the insulating substrate and having light transmittancy, an electron sensitive layer layered on the conductive film, and an antistatic film layered on the electron sensitive layer. When information is recorded by irradiating an electron beam, the electron beam is irradiated upon the electron sensitive layer through the antistatic film in such a state that at least one of the conductive film and the antistatic film is set at a potential to absorb electrons generated by the electron beam.

There is also provided a method of recording information to an electron sensitive layer in an information recording medium in which the electron sensitive layer is provided on an insulating substrate formed of a glass material or the like being transparent to light and having light transmittancy by irradiating an electron beam to the information recording medium. A conductive film having light transmittancy, the electron sensitive layer and the antistatic film are layered on the insulating substrate, an electron beam is irradiated to the electron sensitive layer through the antistatic film in such a state that at least one of the conductive film and the antistatic film is set at a potential to absorb electrons generated by the irradiation of the electron beam.

According to the information recording medium and the method of recording the information recording medium, if charged electrons are generated in the insulating substrate by the irradiation of the electron beam, the charged electrons are removed through the conductive film and/or the antistatic film set at the potential described above. Therefore, unlike the conventional technique according to which charged electrons accumulate in the insulating substrate, the electron beam can come straightforward to the electron sensitive layer, so that high density recording is enabled. In addition, since an insulating substrate being transparent to light is used, a laser beam or the like may be allowed to come into from the insulating substrate side, so that information recorded in the electron sensitive layer can be optically read.

BRIEF DESCRIPTION OF THE DRAWINGS

These and other objects and advantages of the present invention will become clear from the following description with reference to the accompanying drawings, wherein:

FIG. 5 is a micrograph of a master disc manufactured according to the first embodiment, showing a half tone image;

DETAILED DESCRIPTION OF THE PREFERRED EMBODIMENTS

Information recording media and methods for recording information on such an information recording medium according to embodiments of the present invention will be now described in conjunction with the accompanying drawings. Note that a master disc to manufacture a DVD disc allowing high density recording will be described as an information recording medium, and a method for recording information on a master disc will be described as a method for recording information on the recording medium.

First Embodiment

Figure 1:
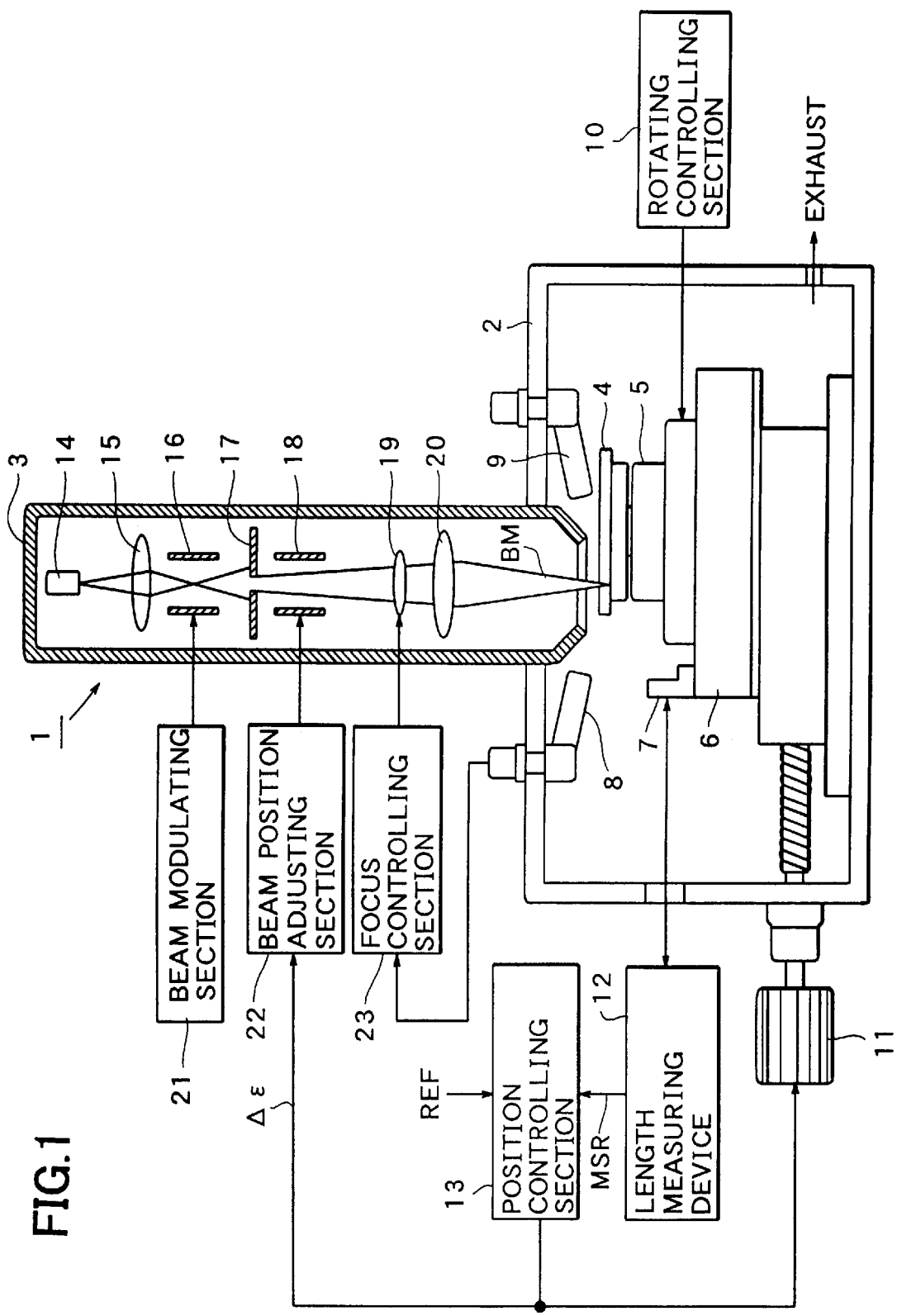
FIG. 1 is a diagram showing a structure of an electron beam recorder according to an embodiment of the present invention.
Figure 2:
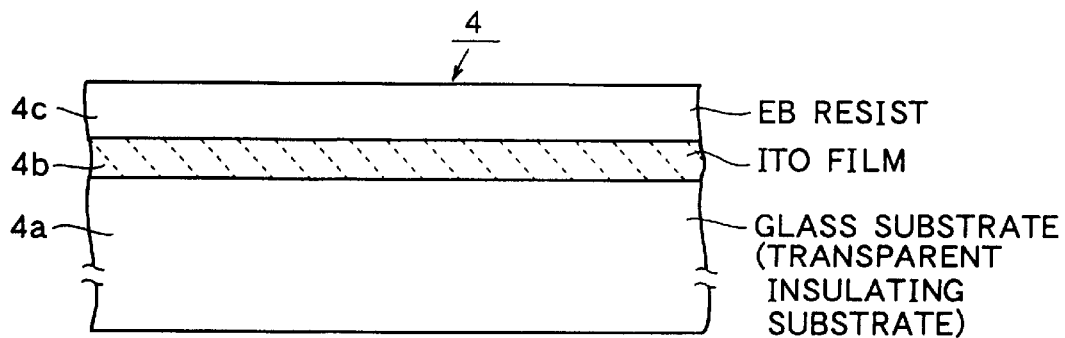
FIGS. 2A, 2B and 2C are cross sectional views for use in illustration of an information recording medium and a recording method thereof according to a first embodiment of the present invention.
Figure 2:
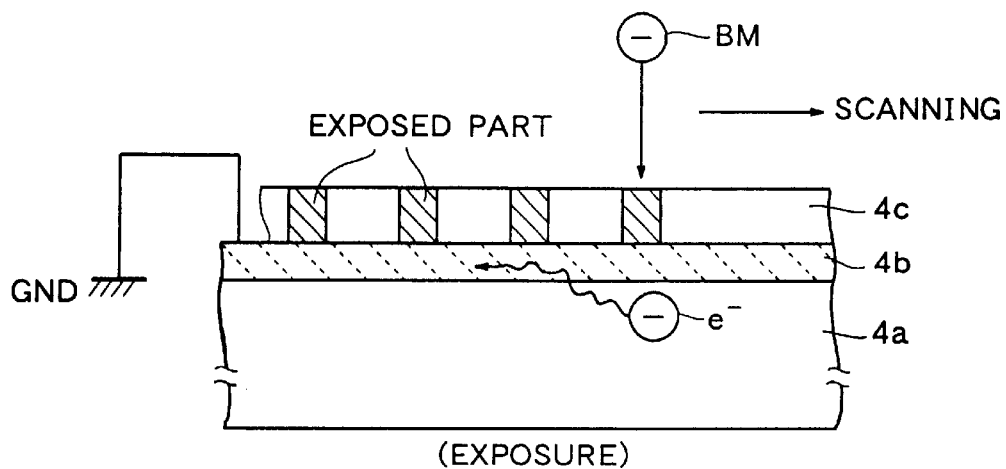
Figure 2:
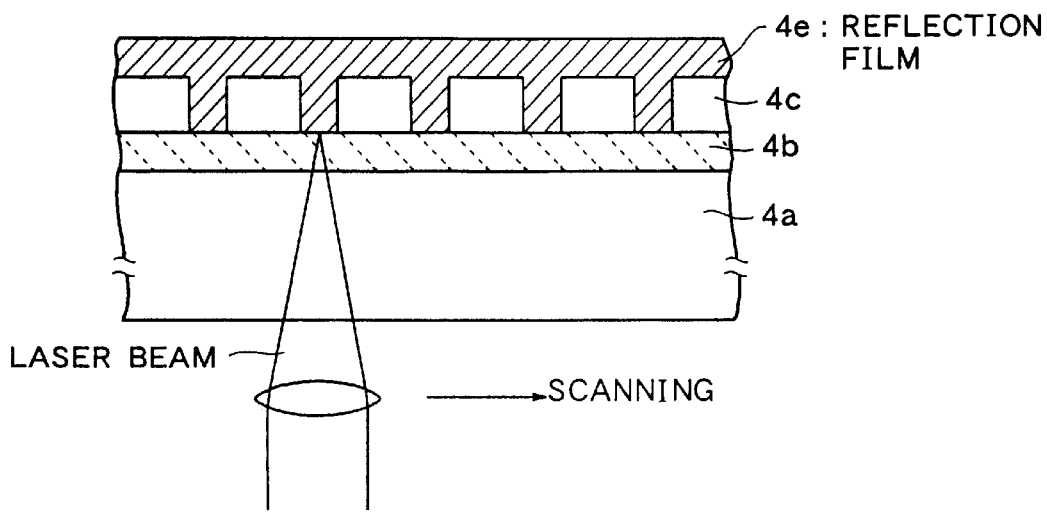

A first embodiment of the present invention will be now described in conjunction with FIG. 1 through FIG. 2C.

FIG. 1 is a view showing the structure of an electron beam recorder 1 for recording a master disc as described above. In FIG. 1, the electron beam recorder 1 includes a vacuum chamber 2, and an electron beam column 3 provided vertically to the vacuum chamber 2.

In the vacuum chamber 2, a spindle motor 5 to rotatably place a master disc 4 while keeping the master disc horizontally, a moving stage 6 to let the spindle motor 5 advance/withdraw in a prescribed direction, a mirror 7 attached to one end of the moving stage 6, and optical sensors 8, 9 to detect focal position of an electron beam BM.

Here, the spindle motor 5 is driven by a rotating controlling section 10 to rotate at a prescribed linear velocity at the time of electron beam exposure which will be described later. The moving stage 6 receives the driving force of an electric motor 11 provided at the outside of the vacuum chamber 2 and advances/withdraws. A laser beam is directed upon the mirror 7 and reflected light thereof is detected by a length measuring device 12 to detect the moving position of the moving stage 6. A position controlling section 13 then produces the error component At between moving information MSR of the moving stage 6 detected by the length measuring device 12 and prescribed reference information REF, and a feed back control is performed to the electric motor 11 based on the error component Ae to control the moving fluctuation of the moving stage 6.

The electron beam column 3 includes an electron gun 14, a condenser lens 15, a blanking electrode 16, an aperture 17, a deflecting electrode 18, a focus lens 19 and an objective lens 20. Electrons radiated from the electron gun 14 are allowed to focus at the central position of the blanking electrode 16 using the condenser lens 15 to generate a cross over point, so that overlapped electron beams are allowed to come into the aperture 17. After an electron beam is deflected by the blanking electrode 16, the electron beam is allowed to come into the aperture 17 such that beam modulation corresponding to information to be recorded is performed. The electron beam passed through the aperture 17 has further its position adjusted by the deflecting electrode 18, has its focal length set using the focus lens 19. At the same time the electron beam is passed through the objective lens 20, so that an electron beam BM having a reduced spot size is generated and directed upon the surface of the master disc 4 placed on the spindle motor 5.

Note that the blanking electrode 16 described above performs deflection described above corresponding to modulated power having information to be recorded, supplied from a beam modulating section 21, the deflecting electrode 18 automatically adjusts the position of the electron beam corresponding to the adjusted power supplied from a beam position adjusting section 22 based on the error component $\Delta\epsilon$, and the focus lens 19 is focus-controlled by a focus controlling section 23 based on the detection information of the irradiation position of the electron beam BM relative to the master disc 4 detected by the optical sensors 8, 9.

Next, the structure of the master disc 4 to be recorded using the electron beam recorder 1 having the above-described structure and a recording method thereof will be now described by referring to longitudinal sectional views shown in FIGS. 2A through 2C. In FIG. 2A, the master disc 4 has an insulating substrate 4a formed of a glass material having light transmittancy (hereinafter referred to as "transparent insulating substrate"), on the surface of which an ITO film 4b as a conductive film having light transmittancy is layered (deposited), and electron beam resist (EB resist) 4c as an electron sensitive layer is spin-coated on the surface of the ITO film 4b.

Note that the light transmittance described above refers to the characteristic to pass therethrough light radiated from a light emitting element such as a semiconductor laser and a light emitting diode, light of all the wavelengths including visible light, ultraviolet light, and infrared light, or light of a particular wavelength among these kinds of light. The insulating substrate having light transmittancy (transparent insulating substrate) therefore refers to an insulating substrate having a characteristic transparent to light of an arbitrary or particular wavelength.

At the time of recording the master disc 4, the master disc 4 is placed on the spindle motor 5, then as shown in FIG. 2B, the ITO film 4b is set at the ground potential of the electron beam recorder 1, and the spindle motor 5 and the moving stage 6 are driven while irradiating the electron beam BM upon the surface of the EB resist 4c, so that master disc 4 is scanned with the electron beam BM. Thus, the EB resist 4c is exposed to the electron beam based on the electron beam BM having recording information, so that pits corresponding to the information to be recorded are formed at the exposed positions.

Here, since the ITO film 4b is set at the ground potential, electrons e⁻ generated by the irradiation of the electron beam BM are removed (absorbed) to the casing or the like of the electron beam recorder 1 through the ITO film 4b. Even if the charged electrons e⁻ accumulate in the transparent insulating substrate 4a, the influence of the electric field will not change the electron beam BM by the function of the ITO film 4b. As a result, the electron beam BM can come straightforward to enter into the EB resist 4c, and therefore high density recording can be achieved.

More specifically, the charge up phenomenon caused by the irradiation of the electron beam BM can be restrained even using the transparent insulating substrate 4a formed of an insulating material, so that the incident position of the electron beam BM relative to the EB resist 4c can be prevented from being shifted. As a result, fine pits can be formed in a high density, and variation in the shape of the pits can be restrained, so that the occurrence rate of defects can be significantly reduced. In addition, since the incident position of the electron beam BM can be prevented from being shifted, the energy density of the electron beam BM at the exposed part of the EB resist 4c can be increased. As a result, a boundary interface can be separately formed between an exposed part and a non-exposed part in a steep shape, and high density recording can be achieved.

After the electron beam exposure has been completed, development and cleaning processings are performed to remove the exposed part of the EB resist to form pits corresponding to information to be recorded.

FIG. 5 is a micrograph showing the shape of the EB resist 4c after performing the development and cleaning processings, and it was confirmed that the high density recording was enabled, and pits having a good shape resulted according to this embodiment.

FIG. 2C is a view for use in illustration of a method of evaluating the recorded master disc 4, a reflection film 4e is formed by sputtering on the surface of the EB resist 4c after performing the development and cleaning processings described above, a laser beam having a spot size reduced (reading light) is irradiated from the side of transparent insulating substrate 4a, and light returned from the recording surface having the pits is optically detected. As a result, in the information recording medium and the recording method according to this embodiment, not only high density electron beam exposure is enabled using the transparent insulating substrate 4a, but also in the evaluation stage, optical evaluation can be performed under the same conditions as a reproducing apparatus, in other words, tracking errors, track pitch fluctuation, the quality of pits and the like can be measured and evaluated.

Note that according to this embodiment described above, as a conductive film (transparent electrode film) having light transmittancy, the ITO is used, but the invention is not limited to this and IXO, a thin metal film, conductive polymer or the like may be used.

Second Embodiment

Figure 3:
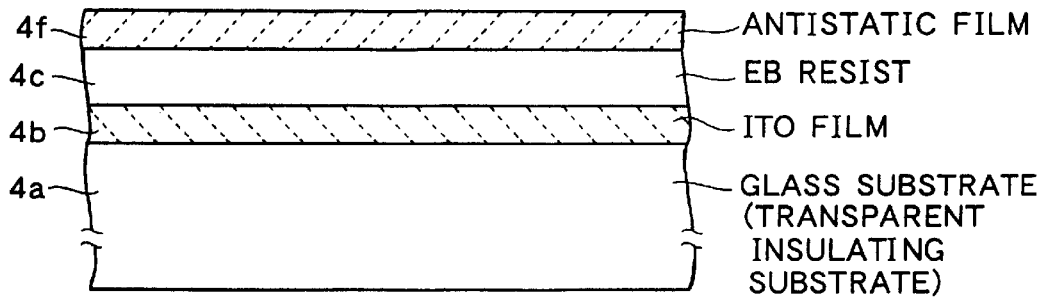
FIGS. 3A, 3B and 3C are cross sectional views for use in illustration of an information recording medium and a recording method thereof according to a second embodiment of the present invention.
Figure 3:
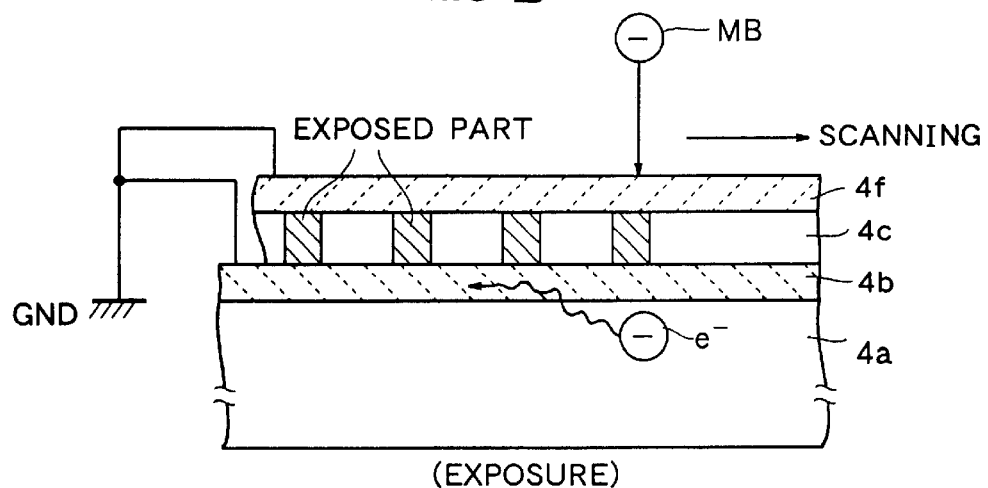
Figure 3:
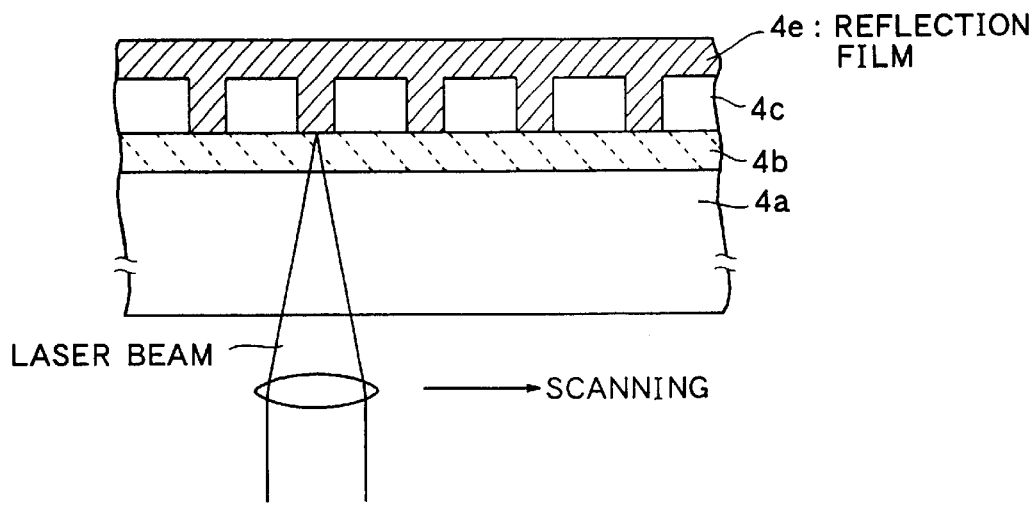

A second embodiment of the present invention will be now described in conjunction with FIG. 3A through FIG. 3C. FIGS. 3A through 3C are longitudinal sectional views showing a master disc 4 as an information recording medium and a recording method of the master disc 4 according to this embodiment. Note that also in this embodiment, electron beam exposure is performed using the electron beam recorder 1 shown in FIG. 1, and therefore the structure of the electron beam recorder will not be described. Also in FIGS. 3A through 3C, the same or corresponding portions to those in FIGS. 2A through 2C are denoted by the same reference characters.

Referring to FIG. 3A, in the master disc 4 according to the embodiment, an ITO film 4b as a conductive film having light transmittancy is layered (deposited) on a surface of a transparent insulating substrate 4a formed of a glass material having light transmittancy, while a surface of the ITO film 4b is spin-coated with electron beam resist (EB resist) 4c as an electron sensitive layer, and a surface of the EB resist 4c is spin-coated with an antistatic film 4f. Furthermore, the antistatic film 4f is conductive and formed of a water soluble material.

At the time of recording the master disc 4, the master disc 4 is placed on the spindle motor 5, and as shown in FIG. 3B, the ITO film 4b and the antistatic film 4f are set at the ground potential of the electron beam recorder 1, while as the surface of the EB resist film 4c is irradiated with the electron beam BM from the side of the antistatic film 4f, the spindle motor 5 and the moving stage 6 are driven to scan the master disc 4 with the electron beam BM. Thus, the EB resist 4c is exposed to the electron beam BM having recording information, and pits corresponding to the information to be recorded are formed at the exposed positions.

Here, since the ITO film 4b and the antistatic film 4f are set at the ground potential described above, charged electrons e⁻ generated by the irradiation of the electron beam BM are removed (absorbed) through the ITO film 4b and/or the antistatic film 4f to the casing of the electron beam recorder Therefore, charged electron e⁻ will not accumulate in the transparent insulating substrate 4a, which allows the electron beam BM to come straightforward into the EB resist 4c, so that high density recording can be achieved.

More specifically, using the transparent insulating substrate 4a formed of an insulating material, the charge up phenomenon caused by the irradiation of the electron beam BM can be restrained, so that the incident position of the electron beam BM to the EB resist 4c can be prevented from being shifted. As a result, similarly to the first embodiment, fine pits can be formed in a high density, and variation in the shape of the pits can be restrained, so that the occurrence rate of defects can be significantly reduced. Since the incident position of the electron beam BM can be prevented from being shifted, the energy density of the electron beam BM in the exposed part of the EB resist 4c can be increased. Therefore, a boundary interface between an exposed part and a non-exposed part can be separately formed in a steep shape, so that high density recording can be achieved.

After the electron beam exposure described above has been completed, a cleaning processing is performed to clean and remove the water soluble antistatic film 4f, followed by development and cleaning processings to the EB resist 4c to remove the exposed part of the EB resist, and thus pits representing the information to be recorded are formed as a result.

FIG. 3C shows a method of evaluating the recorded master disc 4 in which, a reflection film 4e is deposited on the surface of the EB resist 4c by sputtering after the development and cleaning processings described above, a laser beam having its spot size reduced (reading light) is directed from the side of the transparent insulating substrate 4a, and light returned from the recording surface having the pits is optically detected. Therefore, similarly to the first embodiment, by the optical recording medium and the recording method according to this embodiment, not only high density electron beam exposure is enabled using the transparent insulating substrate 4a, but also in the evaluation stage, optical evaluation can be performed under the same conditions as a reproducing apparatus, in other words, tracking errors, track pitch fluctuation, the quality of pits and the like can be measured and evaluated.

Note that in this embodiment, the ITO film 4b and the antistatic film 4f are both set at the ground potential, but the invention is not limited to this. For example, a bias may be set to provide a prescribed potential difference between the ITO film 4b and the antistatic film 4f, and an electric field for accelerating the incidence of the electron beam BM into the EB resist 4c may be generated.

Alternatively, one of the ITO film 4b and the antistatic film 4f may be set at the ground potential, and the other may be set at a bias potential to allow the electron beam BM to come into straightforward.

As the conductive film (transparent electrode film) having light transmittancy, not only ITO, but also IXO, a thin metal film, conductive polymer or the like may be used.

Third Embodiment

Figure 4:
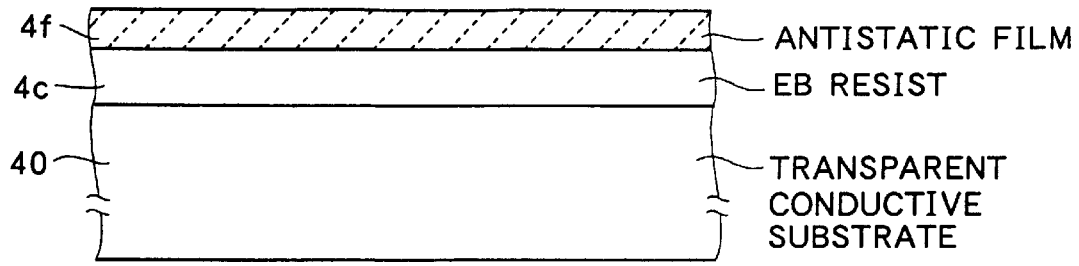
FIGS. 4A, 4B and 4C are cross sectional views for use in illustration of an information recording medium and a recording method thereof according to a third embodiment of the present invention.
Figure 4:
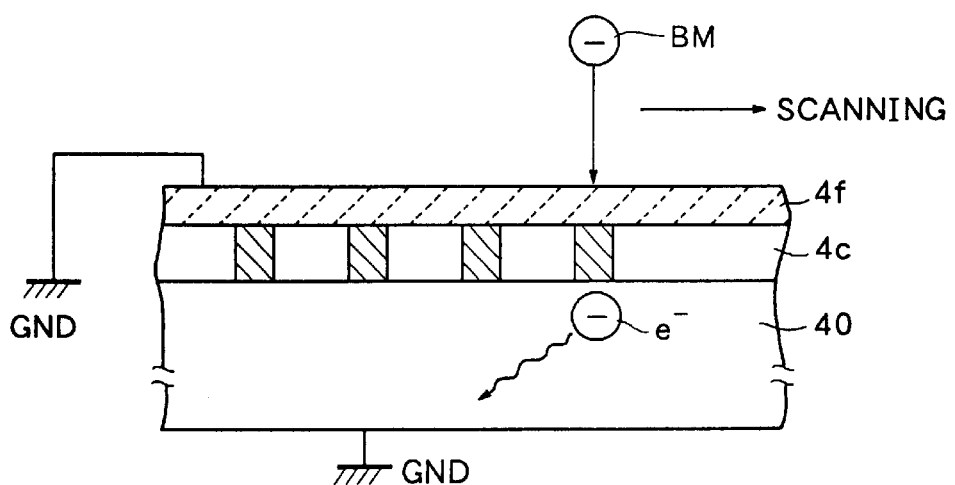
Figure 4:
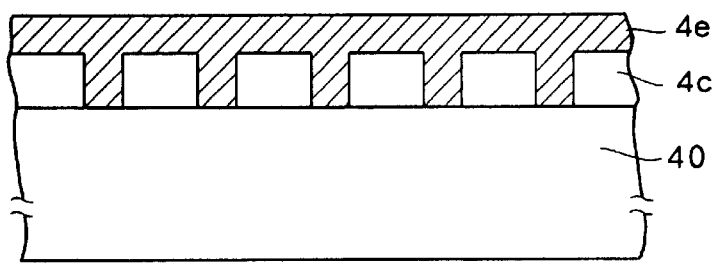
Figure 6:
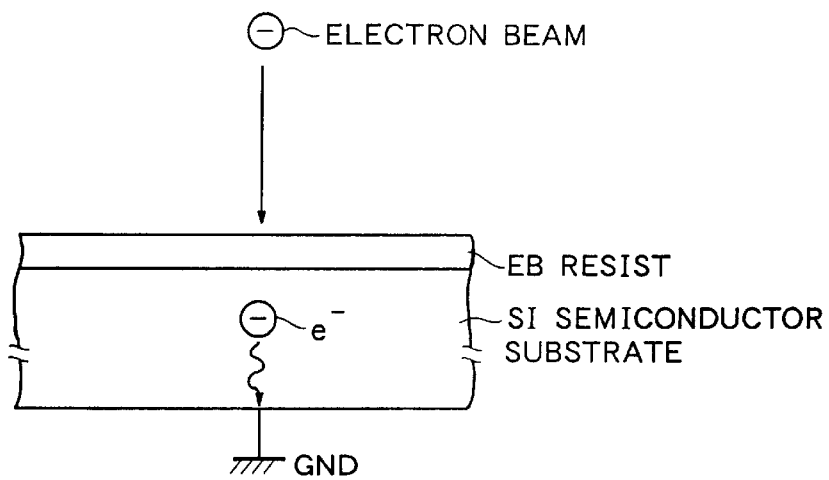
FIGS. 6A, 6B and 6C are cross sectional views for use in illustration of a conventional information recording medium and a recording method thereof.
Figure 6:
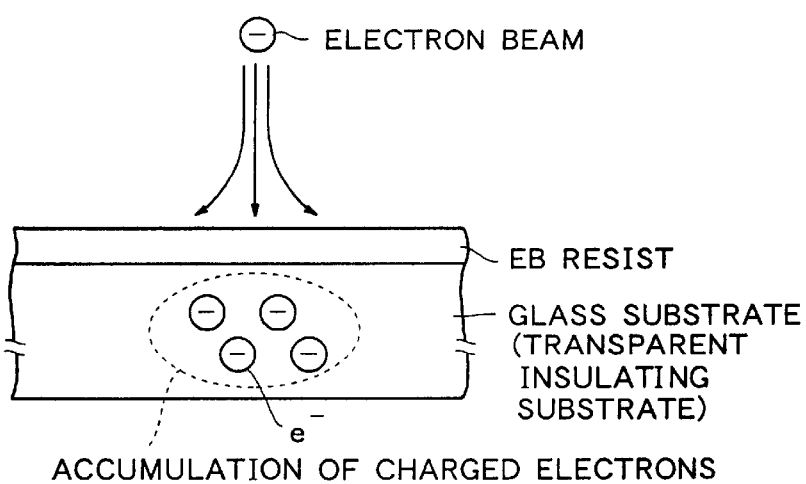
Figure 6:
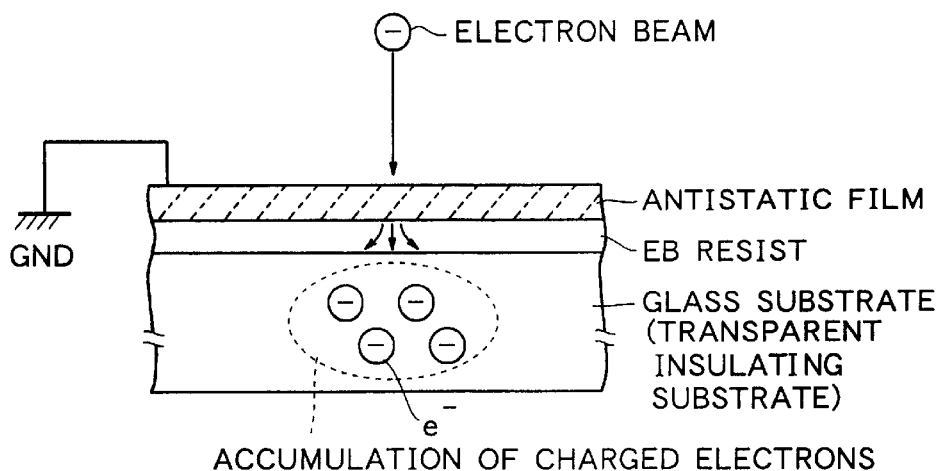
Figure 7:
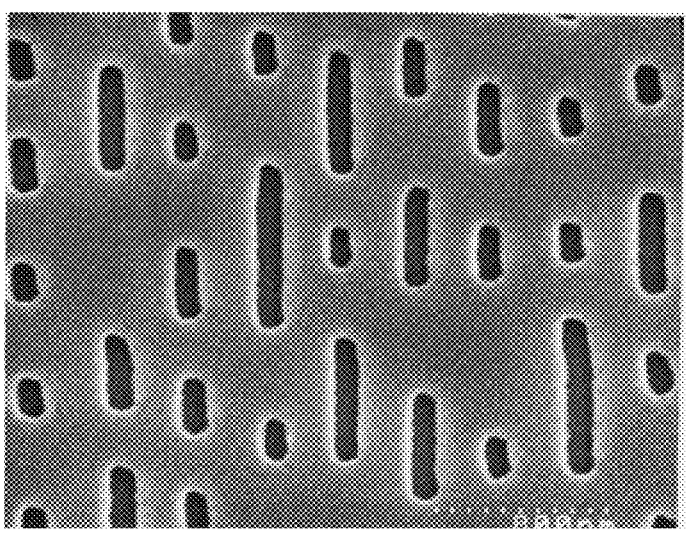
FIGS. 7A and 7B show micrographs of a master disc manufactured according to the conventional information recording medium and recording method thereof, showing a half tone image.
Figure 7:
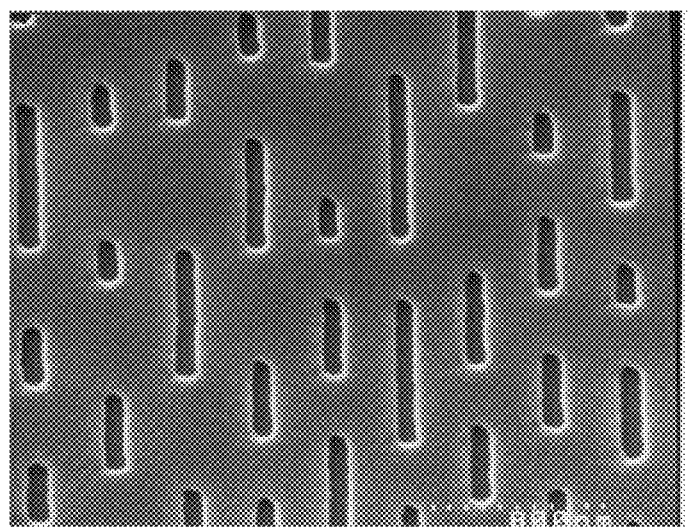

A third embodiment of the present invention will be now described in conjunction with FIGS. 4A through 4C. FIGS. 4A through 4C are longitudinal sectional views showing a master disc 4 as an information recording medium and a method of recording the master disc 4. Note that also in this embodiment, electron beam exposure is performed using the electron beam recorder 1 shown in FIG. 1, and therefore the structure of the electron beam recorder will not be described. Also in FIGS. 4A through 4C, the same or corresponding portions to those in FIGS. 2A through 2C are denoted by the same reference characters.

Referring to FIG. 4A, in the master disc 4 according to this embodiment, a surface of a transparent conductive substrate 40 having light transmittancy and conductivity is spin-coated with electron beam resist (EB resist) 4c as an electron sensitive layer, and a surface of the EB resist 4c is then spin-coated with an antistatic film 4f. Furthermore, the antistatic film 4f is conductive and formed of a water soluble material.

At the time of recording the master disc 4, the master disc 4 is placed on the spindle motor 5, and as shown in FIG. 4B, the transparent conductive substrate 40 and the antistatic film 4f are set at the ground potential of the electron beam recorder 1, while as the surface of the EB resist 4c is irradiated with the electron beam BM from the side of the antistatic film 4f, the spindle motor 5 and the moving stage 6 are driven to scan the master disc 4 with the electron beam BM. Thus, the EB resist 4c is subjected to electron beam exposure with the electron beam BM having information to be recorded, and pits corresponding to the information to be recorded are formed at the exposed positions.

Here, since the transparent conductive substrate 40 and the antistatic film 4f are set at the ground potential, charged electrons e⁻ generated by the irradiation of the electron beam BM are removed (absorbed) through the transparent conductive substrate 40 and/or the antistatic film 4f to the casing or the like of the electron beam recorder 1.

Therefore, the influence of the accumulation of charged electrons e⁻ in the transparent insulating substrate 4a and/or in the EB resist 4c can be reduced, which permits the electron beam BM to come into the EB resist straightforward, so that high density recording can be achieved.

In particular, the use of the transparent conductive substrate 40 having light transmittancy and conductivity permits the charge up phenomenon caused by the irradiation of the electron beam BM to be restrained, and the incident position of the electron beam BM to the EB resist 4c can be prevented from being shifted. As a result, fine pits can be formed in a high density, and variation in the shape of the pits can be restrained as well, so that the occurrence rate of defects can be significantly reduced. In addition, since the incident position of the electron beam BM can be prevented from being shifted, the energy density of the electron beam BM in the exposed part of the EB resist 4c can be increased. As a result, a boundary interface between an exposed part and a non-exposed part can be separately formed in a steep shape, so that high density recording can be achieved.

Then, after the electron beam exposure described above has been completed, a cleaning processing is performed to clean and remove the water soluble antistatic film 4f, followed by development and cleaning processings to the EB resist 4c to remove the exposed part of the EB resist, and thus pits representing the information to be recorded are formed.

As shown in FIG. 4C, a reflection film 4e is deposited by sputtering on the surface of the EB resist 4c after the development and cleaning processings described above, a laser beam having a spot size reduced (reading light) is irradiated from the side of transparent conductive substrate 40, and light returned from the recording surface having the pits formed thereon can be optically detected. Therefore, similarly to the first and second embodiments, by the information recording medium and the recording method thereof according to this embodiment, in the evaluation stage, optical evaluation can be performed under the same conditions as a reproducing apparatus, in other words, tracking errors, track pitch fluctuation, the quality of pits and the like can be measured and evaluated.

Note that the information recording media according to the first through third embodiments are described for illustration of the features of the present invention. Therefore, structures provided by appropriately combining the elements of the present invention as desired are included within the scope of the information recording medium according to the present invention.

Furthermore, while the structure of the master disc and the recording method thereof are described, the present invention is not limited to the information recording medium to manufacture the master disc, and is applicable to common and general purpose information recording media.

The ITO film 4b, reflection film 4e and antistatic film 4f may be in a layer or film structure.

As in the forgoing, in the information recording medium according to the present invention, even if charged electrons are generated in the insulating substrate by the irradiation of an electron beam, the charged electrons can be removed through the conductive film or the antistatic film, so that the electron beam is allowed to come straightforward into the electron sensitive layer for recording information. As a result, high density information recording can be achieved, and a laser beam or the like may be allowed to come into from the insulating substrate side to optically read the information recorded in the electron sensitive layer. Therefore, the information recording medium and the information recording method suitable for electron beam exposure can be provided, so that the technique which could be well utilized in even higher density recording in the future can be provided.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information recording medium on which information is recorded using an electron beam, comprising:

an insulating substrate having light transmittancy, a conductive film layered on said insulating substrate and having light transmittancy, and an electron sensitive layer layered on said conductive film, wherein
when information is recorded using said electron beam, said electron beam is irradiated upon said electron sensitive layer in such a state that said conductive film is set at a potential to absorb electrons generated by the irradiation of said electron beam.

2. An information recording medium on which information is recorded using an electron beam, comprising:

an insulating substrate having light transmittancy, a conductive film layered on said insulating substrate and having light transmittancy, an electron sensitive layer layered on said conductive film, and an antistatic film layered on said electron sensitive layer, wherein
when information is recorded by the irradiation of said electron beam, said electron beam is irradiated upon said electron sensitive layer through said antistatic film in such a state that at least one of said conductive film and said antistatic film is set at a potential to absorb electrons generated by said electron beam.

3. The information recording medium according to claim 1 or 2, wherein said insulating substrate is formed of a glass material.

4. A method for recording information to an electron sensitive layer in an information recording medium by irradiating an electron beam, said electron sensitive layer being provided on an insulating substrate having light transmittancy, said method comprising the steps of:

layering a conductive film having light transmittancy and said electron sensitive layer on said insulating substrate; and
irradiating said electron beam upon said electron sensitive layer in such a state that said conductive film is set at a potential to absorb electrons generated by the irradiation of said electron beam.

5. A method for recording information to an electron sensitive layer in an information recording medium by irradiating an electron beam, said electron sensitive layer being provided on an insulating substrate having light transmittancy, said method comprising the steps of:

layering a conductive film having light transmittancy, said electron sensitive layer and an antistatic film on said insulating substrate; and
irradiating said electron beam to said electron sensitive layer through said antistatic film in such a state that at least one of said conductive film and said antistatic film is set at a potential to absorb electrons generated by the irradiation of said electron beam.

6. The method of recording information according to claim 4 or 5, wherein said insulating substrate is formed of a glass material.

* * * * *